(12) United States Patent
Nair

(10) Patent No.: US 12,428,779 B2
(45) Date of Patent: Sep. 30, 2025

(54) LAMINATE PRECURSOR ROLLS AND LAMINATED DECORATIVE ARTICLES

(71) Applicant: Eastman Kodak Company, Rochester, NY (US)

(72) Inventor: Mridula Nair, Penfield, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 314 days.

(21) Appl. No.: 18/326,097

(22) Filed: May 31, 2023

(65) Prior Publication Data

US 2023/0304217 A1 Sep. 28, 2023

Related U.S. Application Data

(63) Continuation-in-part of application No. 16/720,025, filed on Dec. 19, 2019, now Pat. No. 11,746,463.

(51) Int. Cl.
| | |
|---|---|
| *D06M 23/04* | (2006.01) |
| *D06M 11/79* | (2006.01) |
| *D06M 15/05* | (2006.01) |
| *D06M 15/233* | (2006.01) |
| *D06M 15/507* | (2006.01) |
| *D06M 23/16* | (2006.01) |

(52) U.S. Cl.
CPC ............ *D06M 23/04* (2013.01); *D06M 11/79* (2013.01); *D06M 15/05* (2013.01); *D06M 15/233* (2013.01); *D06M 15/507* (2013.01); *D06M 23/16* (2013.01); *D06M 2200/01* (2013.01); *D06M 2200/30* (2013.01); *D10B 2401/08* (2013.01); *D10B 2401/10* (2013.01); *D10B 2401/13* (2013.01)

(58) Field of Classification Search
CPC .... C09D 5/024; C09D 101/02; C09D 125/06; C09D 167/00; C09D 5/32; C09D 7/41; C09D 7/45; C09D 7/61; C09D 7/69; A47H 23/08; C08K 3/013; C08K 5/0041; C08K 7/22; D06M 2200/01; D06M 2200/30; D06M 23/04; D06N 3/0045; G02B 5/003; B32B 2307/41; B32B 2451/00; B32B 27/04; B32B 27/065; B32B 27/18; B32B 5/02; B32B 5/022; B32B 5/18; B32B 5/20; B32B 5/26
See application file for complete search history.

(56) References Cited

U.S. PATENT DOCUMENTS

| | | | |
|---|---|---|---|
| 3,527,654 A | 9/1970 | Jones et al. | |
| 3,567,565 A | 3/1971 | Jones et al. | |
| 3,607,341 A | 9/1971 | Goins et al. | |
| 3,615,970 A | 10/1971 | May | |
| 3,616,005 A | 10/1971 | Wetstone | |
| 3,748,217 A | 7/1973 | May et al. | |
| 3,901,240 A | 8/1975 | Hoey | |
| 4,039,709 A | 8/1977 | Newman | |
| 4,329,386 A | 5/1982 | Samowich | |
| 4,409,275 A | 10/1983 | Samowich | |
| 4,677,016 A | 6/1987 | Ferziger et al. | |
| 4,830,897 A | 5/1989 | Lichtenstein | |
| 5,132,163 A | 7/1992 | Leaderman et al. | |
| 5,283,111 A | 2/1994 | Schlecker | |
| 5,741,582 A | 4/1998 | Leaderman et al. | |
| 6,541,138 B2 | 4/2003 | Bullock et al. | |
| 6,872,276 B2 | 3/2005 | Cherpinsky et al. | |
| 6,884,491 B2 | 4/2005 | Rubin et al. | |
| 10,942,300 B2 * | 3/2021 | Nair | A47H 23/10 |
| 11,181,247 B2 * | 11/2021 | Nair | B32B 15/14 |
| 11,275,203 B2 * | 3/2022 | Nair | E06B 9/24 |
| 11,549,213 B2 | 1/2023 | Nair et al. | |
| 12,004,676 B1 * | 6/2024 | Nair | C09D 5/03 |
| 2002/0122949 A1 | 9/2002 | Richards | |
| 2004/0170800 A1 | 9/2004 | Richards | |
| 2007/0105471 A1 | 5/2007 | Wang et al. | |
| 2010/0066121 A1 | 3/2010 | Gross | |
| 2015/0234098 A1 | 8/2015 | Lofftus et al. | |
| 2016/0354804 A1 | 12/2016 | Brick et al. | |
| 2016/0355660 A1 | 12/2016 | Brick et al. | |
| 2017/0238476 A1 | 8/2017 | Parrein et al. | |
| 2018/0051155 A1 | 2/2018 | Nair et al. | |
| 2019/0263988 A1 | 8/2019 | Nair | |
| 2021/0189641 A1 * | 6/2021 | Nair | C09D 5/024 |

* cited by examiner

*Primary Examiner* — Lynda Salvatore
(74) *Attorney, Agent, or Firm* — J. Larry Tucker

(57) ABSTRACT

Laminate precursor rolls are prepared by applying an aqueous foamed opacifying composition to a non-woven fabric, drying to form a dry foamed opacifying layer, applying an anti-blocking composition to the dry foamed opacifying layer. Each laminate precursor is rolled up for immediate or later use to make laminate decorative articles when the unrolled laminate precursor is laminated to the back side of a decorative fabric with or without an adhesive. The dry foamed opacifying layer is present at a dry coverage of less than or equal to 1000 g/m². It is composed of (a) porous particles, (b') a matrix material that is derived from a (b) binder material, (c) two or more additives comprising at least one foaming surfactant and at least one foam stabilizer, a very low amount of (d) an aqueous medium, and (e) an opacifying colorant that absorbs electromagnetic radiation having a wavelength of 380-800 nm.

20 Claims, No Drawings

LAMINATE PRECURSOR ROLLS AND LAMINATED DECORATIVE ARTICLES

RELATED APPLICATION

This application is a continuation-in-part of copending and commonly assigned U.S. Ser. No. 16/720,025 (Publication No. US20210189640) filed Dec. 19, 2019, which has been recently allowed, the disclosure of which is incorporated herein by reference.

FIELD OF THE INVENTION

This invention relates to the field of light-blocking materials. In particular, this invention relates to laminated decorative articles having opacifying or light-blocking effect, which articles can be used to form decorative drapes, shades, blinds, or other light-blocking materials. Such laminated decorative articles can be prepared using rolls of coated non-woven fabrics known as laminate precursor rolls, and any of these rolls can then be unrolled and laminated to the back side of a chosen decorative fabric.

BACKGROUND OF THE INVENTION

In general, when light strikes a surface, some of it may be reflected, some absorbed, some scattered, and the rest transmitted. Reflection can be diffuse such as light reflecting off a rough surface like a white wall, in all directions, or specular, as in light reflecting off a mirror at a definite angle. A 100% opaque substance transmits almost no light, and therefore reflects, scatters, or absorbs all of it. Both mirrors and carbon black are opaque. Opacity depends on the selective absorption of the frequency of the light being considered. "Blackout" or light blocking materials typically refer to coated layers in articles that are substantially impermeable to light such as visible and UV radiation. Thus, when a blackout material such as a blackout curtain or blackout shade is hung over a window, it generally blocks substantially all external light from entering the room through that window. Blackout materials are suitable as curtains or shades for use in homes, for institutional use in hospitals, nursing homes, and offices as well as for use in commercial establishments such as hotels, theaters, and aircraft windows where the option of excluding light can be desirable.

Light blocking articles such as the blackout curtains can be comprised of a fabric (porous substrate) coated with several layers of a light-blocking composition. There is a need for these curtains, in addition to blocking transmitted light, to have a light color (hue) facing the environment to aid in illumination to minimize the amount of artificial lighting needed to perform the activity. An example is when the function of the blackout material is to separate two areas of activity where one or both areas can be artificially lit at the same time. More often than not, the function of a blackout curtain is to prevent sunlight from entering a room through a window. It can also be desirable for the color (hue) of the side facing the window to match the exterior décor of the building.

Light colored blackout coatings theoretically can be made by coating porous fabrics with light colored foams containing light scattering pigments such as titanium dioxide or clays. However, when using only these pigments, very thick foam coatings will be needed to create blackout curtains through which the sun is not visible in a darkened room. One method that is practiced for reducing the weight of such blackout materials is to sandwich a light-absorbing, foamed black or grey pigment, such as a carbon black between two foamed light scattering, white pigment-containing layers.

When an electromagnetic radiation blocking coating has, as it often does, a strongly light absorbing material containing black pigments such as carbon black, between two reflective layers, it has at least two distinct problems. First, such materials require three or more separate coating operations that reduce manufacturing productivity and increase unit costs. Secondly, carbon black in the light absorbing middle layer can become "fugitive" during sewing or handling as a result of a puncture or tear, and soil or discolor other layers such as the reflective layers, which is highly objectionable. Additionally, the stitches generated in the materials during sewing can cause the fugitive carbon black from the light absorbing layer to spread over a larger area thereby increasing the area of objectionable contamination of the light-colored surface.

U.S. Pat. No. 9,891,350 (Lofftus et al.) describes improved articles that are designed with an opacifying layer applied to a substrate and that are capable of blocking predetermined electromagnetic radiation.

An improvement in this art is described in U.S. Pat. No. 9,469,738 (Nair et al.) in which small amounts of porous particles containing small amounts of opacifying colorants can be incorporated into foamed compositions that have a foam density of at least 0.1 g/cm$^3$. Such foamed compositions can be applied to a substrate to provide opacification. U.S. Pat. No. 9,963,569 (Nair et al) describes similar technology for making opacifying element using a foamed aqueous latex composition.

U.S. Pat. No. 6,884,491 (Rubin et al.) describes water repellant, water resistant, and stain resistant fabrics that are prepared using treated textile fabrics that are laminated to a backing polymeric film.

It is known to make decorative articles such as draperies using backing liners formed from woven or non-woven fabrics. A typical drapery can be a rectangular piece of decorative fabric whose edges are folded back and hemmed. A drapery made from a single layer of decorative textile fabric is less expensive than a lined drapery but it suffers from the difficulty that it is not fully opaque and that sunlight transmission can cause fading of dyes in the drapery as well in other articles or prevent desired darkening in a room which the drapery is hung. A lined drapery is generally constructed from a relatively high quality decorative fabric that can be printed, embossed, or otherwise carries a design, together with a lining that can be formed from a suitable less expensive woven or non-woven fabric. Such lining functions to reduce the transmission of light to impact the expensive decorative fabric. The lining can also add opacity to make it more difficult for outsiders to see into a room, and it may also provide insulative properties by trapping air between it and the decorative fabric. In addition, a lining can also add some weight to a drapery so that it hangs better. However, lined draperies are more expensive not just because of additional material but because of fabrication costs to attach the lining to the decorative fabric.

A number of solutions have been proposed in the industry to reduce the costs and to achieve the advantages of linings, including the use of foamed linings or foamed adhesives between decorative fabrics and linings. A composite lining comprises a typical inexpensive woven or non-woven material useful as a backing material and a foamed organic polymer that functions as an adhesive for a decorative textile fabric, as described for example, in U.S. Pat. No. 3,748,217 (May et al.). The foamed organic polymer can be applied to a decorative fabric before the inexpensive woven or non-woven or material is laminated to the decorative textile fabric-adhesive combination, followed by curing.

Decorative blackout draperies are described in U.S. Pat. No. 5,741,582 (Lederman et al.) in which an opaque adhesive is applied to a textile material (first substrate) and a second material (second substrate) is then adhered thereto to provide a decorative drapery surface on one side and a lining on the opposing side of the opaque adhesive. The opposing materials can be formed from any suitable woven or non-woven textile composed of naturally-occurring or synthetic fibers. The opaque adhesive can be provided as an acrylic foam containing a black or dark pigment, which acrylic foam is eventually crushed and cured once coated. Multiple adhesive layers can be used if desired, as applied to opposing first and second substrates. Unfortunately, the black or dark pigment in the opaque adhesive layer can show through both textiles that sandwich it and add discoloration to the fabric, unless outer layers of white foam are coated on either side of the black foam to hide that layer and minimize both coloration and fugitive black pigments such as carbon black. This becomes an expensive process that could compromise the decorative fabric during the coating processes.

Decorative fabrics can also be prepared by providing opacifying compositions on their backside and then applying a flock to the opacifying composition for feel and appearance. However, many convertors are not happy with the use of flock because it can dust off the article during various down-stream treatments and become a product contaminant and an environmental health hazard for its flammability and human inhalation of particulate fibers. Moreover, it is hard to apply flock in a uniform manner unless it is applied using electrostatic means and apparatus, which is an expensive operation. Thus, there is a need to avoid the use of flock if possible.

There is also a need for an improved and inexpensive means to provide a variety of laminated light-blocking decorative articles in which flock is avoided but desired fabric feel is achieved on the surface of light-blocking coatings. Moreover, there is a need to make low volumes of laminated light-blocking decorative articles to provide convenient on-demand manufacturing without having to coat short runs.

SUMMARY OF THE INVENTION

The present invention provides a laminate precursor roll comprising a non-woven fabric having a face side and a back side, a dry foamed opacifying layer that is disposed on the back side of the non-woven fabric, and a non-blocking composition disposed on the dry foamed opacifying layer,
  wherein the face side of the non-woven fabric is rolled up in contact with the non-blocking composition, and
  the dry foamed opacifying layer being present at a dry coverage of less than or equal to 1000 g/m², and comprising:
    (a) porous particles in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;
    (b') a matrix material that is derived from a (b) binder material having a glass transition temperature ($T_g$) of less than 25° C., which (b') matrix material is present in an amount of at least 10 weight % and up to and including 80 weight %,
    (c) two or more additives in an amount of at least 0.0001 weight % and up to and including 50 weight %, the two or more additives comprising at least one foaming surfactant and at least one foam stabilizer,
    (d) an aqueous medium in an amount of less than 5 weight %, and
    (e) an opacifying colorant in an amount of at least 0.002 weight % and up to and including 2 weight %, which opacifying colorant being a different material from the (a) porous particles, (b') matrix material, and (c) two or more additives, and which opacifying colorant absorbs electromagnetic radiation having a wavelength of at least 380 nm and up to and including 800 nm,
    all amounts of (a) porous particles, (b') matrix material, (c) two or more additives, (d) aqueous medium, and (e) opacifying colorant being based on the total weight of the dry foamed opacifying layer.

The present invention provides one or more rolls of laminate precursors having opacifying coatings that can be prepared and used as needed ("on-demand") for lamination to decorative fabrics without the need for coating a polymer latex foam directly on the decorative fabric, or for using a metallized layer or flock. Such laminate precursors can be provided for manufacturing short- or long-run batches of laminated light-blocking decorative articles (such as blackout draperies) having customized features as provided by the non-woven fabrics, thereby minimizing waste of directly-coated decorative fabrics. For example, where test samples of blackout (light-blocking) articles derived from decorative fabrics are needed by designers to mock-up a room, on-demand lamination of various laminate precursors from individual rolls at a required yardage of the decorative fabrics becomes more economical than submitting excess decorative fabric to a coating conversion that may not suit the décor until after the fact. In a sense, the present invention provides articles for "proofing" a customer's expectations without using directly coated decorative fabrics. The present invention also eliminates the need for sewing an extra blackout liner and attaching the same to a decorative fabric and avoids the unsuitable multi-blackout compositions, linings, and sandwiched layers commonly used in the industry.

The non-woven fabrics used in this invention can be customized to have various features including printed images and colors.

Moreover, while flock and its problems are avoided, the resulting laminated light-blocking decorative articles are soft to the touch, and can be designed with any desired weight, stiffness (for example, for used as roller shades), or coloration while sufficiently blocking out impinging light. Decorative fabrics used in the manufacturing operation are spared from the risk and expense of stressful coating operations and multiple passes with stretching or tentering.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure can have broader use than is explicitly described or discussed for any particular embodiment.

DEFINITIONS

As used herein to define various components of the aqueous foamed opacifying composition and dry foamed opacifying layer, that is the (a) porous particles, (b) binder materials, (c) two or more additives, (e) opacifying colorant, and other materials used in the practice of this invention, and unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted as having a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, the disclosure of these ranges is intended as a continuous range including every value between the minimum and maximum values as well as the end points of the ranges.

Unless otherwise indicated, the terms "dry foamed opacifying layer" and "dry foamed opacifying layer" are intended to refer to the same feature.

The terms "porous particle" and "porous particles" are used herein, unless otherwise indicated, to refer to porous bead-like polymeric materials useful in the aqueous foamed opacifying compositions essential for the present invention. As defined in detail below, the porous particles generally comprise a solid continuous polymeric phase having an external particle surface and discrete pores dispersed within the continuous polymeric phase. The continuous polymeric phase also can be chemically crosslinked or elastomeric in nature.

The continuous polymeric phase of the porous particles generally has the same composition throughout that solid phase. That is, the continuous polymeric phase is generally uniform in composition including any components [for example, (e) opacifying colorant] that can be incorporated therein. In addition, if mixtures of polymers compose the continuous polymeric phase, generally those mixtures also are uniformly distributed throughout.

As used in this disclosure, the term "isolated from each other" refers to the different (distinct) pores of the same or different sizes that are separated from each other by some portion of the continuous solid phase and such discrete pores are not interconnected. Thus, "discrete" pores refer to "individual" or "closed" non-connected pores or voids distributed within the continuous polymeric phase.

The (a) porous particles can include "micro," "meso," and "macro" discrete pores, which according to the International Union of Pure and Applied Chemistry, are the classifications recommended for discrete pore sizes of less than 2 nm, from 2 nm to and including 50 nm, and greater than 50 nm, respectively. Thus, while the (a) porous particles can include closed discrete pores of all sizes and shapes (that is, closed, non-interconnected discrete pores entirely within the continuous polymeric phase) providing a suitable volume in each discrete pore, macro discrete pores are particularly useful. While there can be open macro pores on the surface of the (a) porous particle, such open pores are not desirable for providing the advantages of the present invention, and may be present only by accident. The size of the (a) porous particles, their formulation, and manufacturing conditions are the primary controlling factors for discrete pore size. However, typically the discrete pores have an average size of at least 0.1 nm and up to and including 7,000 nm, or more likely at least 200 nm and up to and including 2,000 nm. Whatever the size of the discrete pores, they are generally distributed randomly throughout the continuous polymeric phase. However, if desired, the discrete pores can be grouped predominantly in one part (for example, in a "core" portion or in a "shell" portion) of the (a) porous particles.

Unless otherwise indicated, the term "non-porous" refers to particles that are not designed to have discrete pores or compartments within the solid continuous polymeric phase and less than 20% of their total volume consists of pores.

"Opacity" is a measured parameter of an opacifying element according to the present invention, which characterizes the extent to which the transmission of electromagnetic radiation such as visible light is blocked. A greater opacity indicates a more efficient blocking (hiding) of electromagnetic radiation or high light-blocking for the dry foamed opacifying layer.

Glass transition temperature of the organic polymers used to prepare the continuous polymeric phase, or (b) binder materials described below, can be measured using Differential Scanning calorimetry (DSC) using known procedures. For many commercially available organic materials, the glass transition temperatures are known from suppliers.

The terms "decorative fabric" and "non-woven fabric" are defined below.

The term "fabric" is meant to refer to a material composed of or prepared from naturally occurring fibers, synthetic fibers, or a mixture of naturally occurring fibers and synthetic fibers of any desirable length.

Uses

The method described herein can provide a means for easily making one or more rolls of laminate precursors that can be used as needed to provide laminated light-blocking decorative articles of desired weight, stiffness, opacity, color, and feel. These laminated light-blocking decorative articles can have suitable light-blocking properties and color for use in various environments and structures. Such laminated light-blocking decorative articles may also exhibit improved sound and heat blocking properties. They can be used as, for example, draperies and other window treatments, room dividers, cubicle curtains, banners, labels, coverings and tarpaulins (for example for vehicles, boats, and other objects), and packaging materials. The laminated light-blocking decorative articles can optionally have one or more printable outer surfaces that are able to accept ink used in screen printing, gravure printing, inkjet printing, thermal imaging (such as "dye sublimation thermal transfer"), or other imaging processes. As decorative surfaces go, the laminate precursor rolls and laminated light-blocking decorative articles prepared therefrom can have any type of decorative image, text, pattern, or combination thereof, as can be conceivably created by a person or machine.

For example, laminate light-blocking decorative articles can be window shades having blackout properties, feel, and other properties desired by the customer.

Non-Woven Fabrics

Each non-woven fabric used in the practice of the present invention has two opposing sides, which are a face side and a back side. These two opposing sides can be the same or different in appearance, texture, feel, antimicrobial properties, or chemical composition, but the back side and face side labels are used to distinguish how the opacifying element is arranged in relation to the applied aqueous foamed opacifying composition (and optional anti-blocking material) and decorative fabric as described in the text below.

For example, the non-woven fabric can be composed of a blended or nonblended fabric, and can be considered as spunlaced non-woven fabrics (or tanglefaced non-woven fabrics). Spunlaced non-woven fabrics are generally textile fabrics consisting of fibers entangled in a predetermined pattern to form a strong, unbonded structure. Thus, such non-woven fabrics can be typically in the form of fabrics composed of fibers locked into place by fiber interaction, thereby providing a cohesive structure without the need for chemical binders or fiber fusing.

Useful non-woven fabrics can be formed from naturally-occurring fibers, synthetic fibers, or mixtures of naturally-occurring fibers and synthetic fibers. Alternatively, an outer surface can be covered by suitable means with a colorless continuous or discontinuous layer to provide a desired protective finish, or anti-microbial or soil release properties. In many instances, the image formed in this manner, for example, on an outer surface, is not visible or discernible from the other outer surface of the laminated decorative article. Polyester fibers are particularly useful, especially for spunlaced non-woven fabrics. In additions, blends of one or more naturally-occurring fibers and synthetic fibers can be used.

It is also possible that the non-woven fabrics are suitably tinted or colored using dyes or pigments that would be readily apparent to one skilled in this art in the fabric industry. Moreover, the non-woven fabrics can have one or more printed pattern or images on the face side, and such patterns or images can be provided before or after lamination to the decorative fabric.

Useful non-woven fabrics can be obtained from various industrial sources, and the processes for making them are well known including the teachings in U.S. Pat. No. 3,748,217 (noted above), the disclosure of which is incorporated herein by reference, especially with respect to the teaching in Cols. 3 and 4 and the references cited therein.

Useful non-woven fabrics can have a basis weight (or "fabric weight") of at least 0.5 oz/yd$^2$ (or 16.95 g/m$^2$), or at least 1 oz/yd (33.9 g/m$^2$). In other embodiments, the basis weight for non-woven fabrics used in this invention can up to and including 25 oz/yd$^2$ (or 847.7 g/m$^2$), or up to and including 12.5 oz/yd$^2$ (423.9 g/m$^2$).

Thus, in the practice of this invention, the various non-woven fabrics used to provide the various rolls of laminate precursors can have the same or different color, stiffness, textile, feel, chemical composition, or other mechanical or chemical properties. This is one of the main advantages of the present invention in that the various non-woven fabrics can be different in any desired manner.

In many embodiments, the non-woven fabric can comprise a material that has been treated in one or more ways to provide water-repellency or stain resistance, or both, particularly on its face side. For example, such treatments can comprise applying a suitable fluorochemical treating agent, with or without a suitable antimicrobial agent (or biocide), to either or both of the face and back sides of a non-woven fabric material as well as to interstitial spaces within the non-woven fabric material, to provide a "treated" non-woven fabric, followed by suitable drying or curing at elevated temperatures. A representative treatment process is described in Cols. 4-6 of U.S. Pat. No. 6,884,491 (noted above) as well in Cols. 6ff of U.S. Pat. No. 6,541,138 (Bullock et al.), the disclosures of both of which are incorporated herein by reference. The treatment solutions can include one or more biocides (such as antimicrobials), crosslinking agents (including self-crosslinking latex polymers), soil releasing agents, fire retardants, smoke suppressants, dispersants, thickeners, dyes, pigments, UV light stabilizers, and other additives that would be readily apparent to one skilled in the art. Such treatments can be particularly useful on the face side of the non-woven fabric.

In general, suitable non-woven fabrics can have a dry average thickness of at least 50 μm, and the thickness can depend upon various industrial and customer factors. This dry average thickness can be determined when the on-woven fabric comprises less than 5 weight % water (based on the total weight of the non-woven fabric) using the average of at least 3 measurements taken at different places, or as determined using a suitable micrograph image.

Decorative Fabrics

Each decorative fabric used according to the present invention has two opposing sides, which are a face side (usually a viewable or observer's side) and a back side. These two opposing sides can be the same or different in appearance, texture, feel, pattern, color, or composition, but the back side and face side labels are used to distinguish how the decorative fabric is arranged in relation to the unrolled laminate precursor. The face side of such decorative fabrics can be any desired image, raised texture, "quilting," or embossed design, and thus generally have a decorative function. Means for providing this decorative function are known in the art and include but are not limited to, decorative weaving, printing using dye sublimation, screen or digital printing, and inkjet printing. Thus, decorative fabrics are generally fabrics having decorative applied art and can be patterned, embossed, or printed. The ornamentation of such decorative fabrics can consist of repeated patterns and is achieved either by weaving, priming, or embroidering. For example, the decorative fabric can be a woven fabric having a repeating design pattern that is woven or embroidered into the decorative fabric.

A decorative fabric can be in the form of woven or non-woven materials that are composed of naturally-occurring fibers, synthetic fibers, or mixtures of naturally-occurring fibers and synthetic fibers. Suitable naturally-occurring fibers include but are not limited to, fibers of cotton, linen, ramie, silk, wool, and others known in the natural world, and blends of fibers of such naturally-occurring materials. Suitable synthetic fibers include but are not limited to, fibers of nylon, polyesters, acrylics, glass (fiberglass), polyurethanes, polyamides, polycarbonates, rayon, polyolefins, celluloses (include woven or non-woven paper materials), acetates, aromatic polyamides, polyvinyl chloride, and others known in the art, as well as combinations or blends of any of these types of fibers, such as polyvinyl chloride coated fibers of various materials. Useful fabrics also can be composed of polyvinyl chloride-clad polyester or polyvinyl chloride-clad fiberglass. Suitable fabric materials include but are not limited to, double cloth jacquards (that is fabrics manufactured on a jacquard loom), brocades, dobby fabrics, prints, poplins, cross-dyes, crepes, and canvasses.

In some embodiments, the decorative fabric is a porous fabric comprising a plurality of continuous yarn strands, all woven together, wherein each yarn strand comprises a multifilament core that is coated with a coating comprising a thermoplastic polymer. Further details for such decorative fabrics and their use are provided in U.S. Patent Application Publication 2018/0223474 (Nair et al.), the disclosure of which is incorporated herein by reference.

In many embodiments, the decorative fabric can comprise a material that has been treated in one or more ways to provide water-repellency or stain resistance, or both, on either or both face and back sides. For example, such treatments can comprise applying a suitable fluorochemical treating agent, with or without a suitable antimicrobial agent (or biocide), to the face side and back side of a decorative fabric material as well as to interstitial spaces within the decorative fabric material, to provide a "treated" decorative fabric, followed by suitable drying or curing at elevated temperatures. A representative treatment process is described in Cols. 4-6 of U.S. Pat. No. 6,884,491 (noted above) as well in Cols. 6ff of U.S. Pat. No. 6,541,138 (Bullock et al.), the disclosures of both of which are incorporated herein by reference. The treatment solutions can include one or more biocides (such as antimicrobials), crosslinking agents (including self-crosslinking latex polymers), soil releasing agents, fire retardants, smoke suppressants, dispersants, thickeners, dyes, pigments, UV light stabilizers, and other additives that would be readily apparent to one skilled in the art.

For example, a decorative fabric material can be treated with at least one or more biocidal agents capable of destroying or preventing the activity of bacteria, viruses, fungi, or mold, many of which materials are known in the art, including antibiotics, trialkyl tin compounds, copper compounds, copper complexes of dehydroabietyl amine or 8-hydroxyquinolinium 2-ethylhexoate, copper naphthenate, copper oleate, organosilicon quaternary ammonium compounds, silver metal and various silver salts.

One or more treatments of the decorative fabric material can be carried out to achieve the desired properties while maintaining desired hand, feel, texture, drape, and aesthetic appearance.

In general, suitable decorative fabrics can have a dry average thickness of at least 50 μm, and the thickness can depend upon the use of the laminated decorative article and the type of decorative fabric materials available for use. This dry average thickness can be determined when the decorative fabric comprises less than 5 weight % water (based on the total weight of the decorative fabric) using the average of at least 3 measurements taken at different places, or as determined using a suitable micrograph image.

The decorative fabric can also have an openness of at least 0% and up to and including 10%, or even at least 1% and up to and including 10%. "Openness" (Openness Factor, or OF) refers to how tight the weave is in a decorative fabric material, the percentage of holes in a fabric construction, and is sometimes referred to as "weave density." The lower the OF, the less the light transmittance and the greater the visible light that is obstructed or blocked. It is the ratio between transparent and opaque surfaces and depends on the spacing and dimension of the yarn.

Aqueous Foamed Opacifying Compositions

Each aqueous foamed opacifying composition comprises five essential components (a), (b), (c), (d), and (e) as defined below that are essential for providing desired properties in a dry foamed opacifying layer produced by the method of this invention.

The aqueous foamed opacifying composition generally has at least 35% solids and up to and including 70% solids, or more particularly at least 40% solids and up to and including 60% solids.

(a) Porous Particles:

Porous particles used in the present invention containing discrete pores (or compartments or voids) are generally prepared using one or more water-in-oil emulsions in combination with an aqueous suspension process, such as in the Evaporative Limited Coalescence (ELC) process that is known in the art. The details for the preparation of the porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the porous particles can be made by a multiple emulsion process that provides formation of individual porous particles comprising a continuous polymer phase and multiple discrete internal pores, and such individual porous particle is dispersed in an external aqueous phase. The described Evaporative Limited Coalescence (ELC) process is used to control the particle size and distribution while a hydrocolloid is incorporated to stabilize the inner emulsion of the multiple emulsions that provide the template for generating the discrete pores in the porous particles.

The (a) porous particles used in this invention generally have a porosity of at least 20 volume %, at least 35 volume %, or at least 40 volume %, and up to and including 60 volume %, up to and including 65 volume %, or up to and including 70 volume %, all based on the total porous particle volume. Porosity can be measured by an obvious modification of the known mercury intrusion technique. Except as noted below, the volume of each discrete pore is essentially full of air with perhaps some non-evaporated water present.

Thus, the (a) porous particles are generally polymeric and organic in nature (that is, the continuous polymeric phase is polymeric and organic in nature) and non-porous particles (having less than 20% porosity) are excluded from use in the present invention. Inorganic particles can be present on the outer surface of each porous particle if desired.

The (a) porous particles can be composed of a continuous polymeric phase derived from one or more organic polymers that are chosen so that the continuous polymeric phase has a glass transition temperature ($T_g$) of at least 25° C., or more typically of at least 25° C. and up to and including 180° C., as determined using Differential Scanning calorimetry.

The continuous polymeric phase can comprise one or more organic polymers having the properties noted above, in an amount of at least 70 weight % and up to and including 100 weight % based on the total polymer weight in the continuous polymeric phase. In some embodiments, the continuous polymeric phase is composed of one or more cellulose polymers (or cellulosic polymers) including but not limited to, those cellulosic polymers derived from one or more of cellulose acetate, cellulose butyrate, cellulose acetate butyrate, and cellulose acetate propionate. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures. Details about such polymers are provided, for example, in U.S. Pat.

No. 9,963,569 (Nair et al.), the disclosure of which is incorporated herein by reference.

In other embodiments, the continuous polymeric phase can comprise one or more organic polymers such as polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Other useful polymers include polyurethanes, urethane acrylic copolymers, epoxy resins, silicone resins, polyamide resins, and polyesters of aromatic or aliphatic polycarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The polyesters can be saturated or unsaturated. Other useful polyesters include lactic acid polymers, glycolic acid polymers, caprolactone polymers, and hydroxybutyric acid polymers. Details of such useful polymers are provided, for example in U.S. Pat. No. 9,891,350 (Lofftus et al.) and U.S. Pat. No. 9,469,738 (Nair et al.), the disclosures of both of which are incorporated herein by reference.

The continuous polymeric binder of the (a) porous particles can also be derived from ethylenically unsaturated polymerizable monomers and polyfunctional reactive compounds as described for example in U.S. Pat. No. 8,703,834 (noted above), the disclosure of which is incorporated herein by reference.

In some embodiments, the continuous polymeric phase of the (a) porous particles comprises one or more cellulose polymers, a polyester, a polystyrene, or a combination thereof.

In general, the (a) porous particles used in the present invention have a mode particle size equal to or less than 50 µm, or of at least 2 µm and up to and including 50 µm, or typically of at least 3 µm and up to and including 30 µm or even up to and including 40 µm. Most useful (a) porous particles have a mode particle size of at least 3 µm and up to and including 20 µm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

Pore stabilizing materials such as hydrocolloids can be present within at least part of the volume of the discrete pores distributed throughout the continuous polymeric phase, which pore stabilizing materials are described in the Nair, Nair et al., and Putnam et al. patents cited above. For example, the pore stabilizing hydrocolloids can be selected from the group consisting of carboxymethyl cellulose (CMC), a gelatin or gelatin derivative, a protein or protein derivative, polyvinyl alcohol and its derivatives, a hydrophilic synthetic polymer, and a water-soluble microgel.

It can be desired in some embodiments to provide additional stability of one or more discrete pores in the (a) porous particles during their formation, by having one or more amphiphilic block copolymers disposed at the interface of the one or more discrete pores and the continuous polymeric phase. Such materials are "low HLB," meaning that they have an HLB (hydrophilic-lipophilic balance) value as it is calculated using known science, of 6 or less, or even 5 or less. The details of these amphiphilic polymers and their use in the preparation of the (a) porous particles are provided in U.S. Pat. No. 9,029,431 (Nair et al.), the disclosure of which is incorporated herein by reference. A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful including other polymeric emulsifiers such as GRINDSTED® PGPR 90, polyglycerol polyricinolate emulsifier, obtained from Danisco, Dupont.

Such an amphiphilic copolymer can be generally present in the (a) porous particles in an amount of at least 1 weight %, or at least 2 weight % and up to and including 50 weight %, based on total (a) porous particle dry weight.

The (a) porous particles used in this invention can be spherical or non-spherical depending upon the desired use. In a method used to prepare the (a) porous particles, additives (shape control agents) can be incorporated into the first or second aqueous phases, or in the oil (organic) phase to modify the shape, aspect ratio, or morphology of the (a) porous particles, using known technology. The (a) porous particles can also comprise surface stabilizing agents, such as colloidal silica, on the outer surface in an amount of at least 0.1 weight %, based on the total dry weight of the (a) porous particle.

The average size of the discrete pores in the (a) porous particles is described above.

The (a) porous particles can be provided as powders, or as aqueous suspensions (including water or water with water-miscible organic solvents such as alcohols). Such powders and aqueous suspensions can also include surfactants or suspending agents to keep the (a) porous particles suspended or for rewetting them in an aqueous medium.

The (a) porous particles are generally present in a dry foamed opacifying layer in an amount of at least 0.1 weight % and up to and including 35 weight %, or typically at least 0.5 weight % and up to and including 25 weight %, or even at least 1 weight % and up to and including 20 weight %, based on the total weight of the dry foamed opacifying layer (including any residual aqueous medium), particularly when the (a) porous particles have a mode size of at least 3 µm and up to and including 20 µm.

In the dry foamed opacifying layer, the large mismatch in refractive index between the discrete pores of the (a) porous particles and the polymer walls (continuous polymeric phase), causes incident electromagnetic radiation passing through the dry foamed opacifying layer to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the dry opacifying layer. If a small amount of (e) opacifying colorant is present in the (a) porous particles, for example either in the discrete pores or in the continuous polymer phase of the (a) porous particles, the opacifying power of the dry foamed opacifying layer is increased. This is because the multiple scattering of electromagnetic radiation in the dry foamed opacifying layer increases the path length of the electromagnetic radiation through it, thereby increasing the chance that the electromagnetic radiation will encounter the (e) opacifying colorant and be blocked or absorbed by it.

(b) Binder Materials:

The aqueous foamed opacifying composition also contains one or more (b) binder materials to hold the (a) porous particles, (c) two or more additives, and (e) opacifying colorant together on the non-woven fabric after the composition has been applied thereto. The one or more (b) binder materials can behave as a binding matrix for all the materials in such wet compositions, and can form a (b') matrix material to hold the (a) porous particles, (c) one or more additive, and (e) opacifying colorant(s) together in a dry foamed opacifying layer.

It is particularly useful that a (b) binder material have the following properties: (i) it is water-soluble or water-dispersible; (ii) it is capable of being disposed onto a suitable substrate as described below; (iii) it is capable of being dried and at least partially crosslinked (or at least partially cured); (iv) it has good light and heat stability; and (v) it is film-forming but contributes to the flexibility of the laminate precursor (and later laminated decorative article) and is thus not too brittle, for example generally having a glass transition temperature ($T_g$) of less than 25° C., or of less than 0° C., or of less than or equal to −10° C., or of less than or equal to −25° C., as determined using Differential Scanning calorimetry.

The choice of (b) binder materials can also be used to optimize a (b') matrix material in the dry formulation of all of the (a), (c), and (e) materials described herein, to provide desired properties. For example, the (b) binder material can be used to provide a (b') matrix material that adds to a supple feel to touch and a flexibility desired, for example, for hanging draperies. The (b') matrix material derived from the (b) binder material upon its at least partial and possibly, full curing or crosslinking.

The (b) binder material can include one or more organic polymers that are film forming and that can be provided as an emulsion, dispersion, or in an aqueous solution, and that cumulatively provide the properties noted above. It can also include one or more polymers that are self-crosslinking or self-curable, or it can include one or more polymers that are self-crosslinking or self-curable, or it can include one or more polymers to which crosslinking agents are added and are thus curable or capable of being at least partially crosslinked under appropriate conditions.

For example, if the (b) binder material comprises a crosslinkable (or curable) polymer in the presence of a suitable crosslinking or curing agent or catalyst, such crosslinking (or curing) can be activated chemically with heat, radiation, or other known means. A curing or crosslinking process serves to provide improved insolubility of the resulting dry foamed opacifying layer as well as cohesive strength and adhesion to the substrate. The curing or crosslinking agent is generally a chemical having functional groups capable of reacting with reactive sites in a (b) binder material (such as a functionalized latex polymer) under curing conditions to thereby produce a crosslinked structure.

Representative crosslinking agents include but are not limited to, multi-functional aziridines, aldehydes, methylol derivatives, and epoxides.

Useful (b) binder materials include but are not limited, to poly(vinyl alcohol), poly(vinyl pyrrolidone), ethylene oxide polymers, polyurethanes, urethane-acrylic copolymers, other acrylic polymers, styrene-acrylic copolymers, vinyl polymers, styrene-butadiene copolymers, acrylonitrile copolymers, and polyesters, silicone polymers or a combination of two or more of these organic polymers. Such (b) binder materials are readily available from various commercial sources or they can be prepared using known starting materials and synthetic conditions. The (b) binder material can be anionic, cationic or nonionic in total charge. A useful class of film-forming (b) materials includes aqueous latex polymer dispersions such as acrylic latexes that can be ionic or nonionic colloidal dispersions of acrylate polymers and copolymers. Useful film-forming aqueous latexes include styrene-butadiene latexes, poly(vinyl chloride) and poly (vinylidene chloride) latexes, poly(vinyl pyridine) latexes, poly(acrylonitrile) latexes, and latexes formed from acrylonitrile, butyl acrylate, and ethyl acrylate.

The one or more (b') matrix materials derived from one or more (b) binder materials, can be present in the dry foamed opacifying layer in an amount of at least 10 weight % and up to and including 80 weight %, or typically at least 20 weight % and up to and including 60 weight %, based on the total dry foamed opacifying layer (that is, the total weight of all components including any residual solvent).

It is useful that the dry weight ratio of the (a) porous particles to the (b') matrix material in the dry foamed opacifying layer is at least 2:3 and up to and including 9:1, and more likely at least 1:1 and up to and including 3:1.

(c) Two or More Additives:

The dry foamed opacifying layer used in the present invention can further include (c) two or more additives in an amount of at least 0.0001 weight % and up to and including 50 weight % and typically at least 1 weight % and up to and including 45 weight %, based on the total weight of the dry foamed opacifying layer (including any residual aqueous medium). These amounts refer to the total amounts of the (c) two or more additives, not to each additive individually.

Such (c) two or more additives include materials such as dispersants, foaming surfactants, foam stabilizers, plasticizers, fire retardants, biocides (such as fungicides and antimicrobials), preservatives, thickeners, pH buffers, thickeners, and inert inorganic and organic fillers that are not inorganic or organic pigments (colorants). There can be mixtures of each type of the (c) two or more additives or mixtures of two or more types of (c) two or more additives in each dry opacifying layer. It is particularly useful in most dry foamed opacifying layers to include at least one foaming surfactant and at least one foam stabilizer, and representative materials are defined below.

Such (c) two or more additives are different from the (e) opacifying colorants (described below) because individually or collectively, they will not substantially block or absorb incident electromagnetic radiation in the wavelength range of at least 380 nm and up to and including 800 nm, as determined in the manner described above for the (e) opacifying colorant.

Any of these (c) two or more additives thereof can be present within any location of the dry foamed opacifying layer, including but not limited to: the continuous polymeric phase of the (a) porous particles; a volume of some or all the discrete pores of the (a) porous particles; or both the volume of the discrete pores and the continuous polymeric phase of the (a) porous particles. Alternatively, such (c) two or more additives can be present in the (b) binder material alone, or in both the (b) binder material and in the (a) porous particles.

It would also be understood that while such (c) two or more additives can be in the dry foamed opacifying layer, and the same or different (c) two or more additives can be also present in the non-woven fabric or decorative fabric described above. Thus, any of the (c) two or more additives can be present in the same or different amounts in multiple locations in the laminate precursor roll prepared according to the present invention.

The "inert" inorganic or organic fillers useful as (c) two or more additives are particles that can be added to reduce the use of more expensive (b) binder materials. Such inert materials do not undergo a chemical reaction in the presence of water or other components in an aqueous foamed opacifying composition (described below); nor do they absorb electromagnetic radiation like the (e) opacifying colorants. Useful inert organic or inorganic filler materials include but are not limited to titanium dioxide, talc, clay (for example, kaolin), magnesium hydroxides, aluminum hydroxides, dolomite, glass beads, silica, mica, glass fibers, nano-fillers, calcium carbonate, and combinations thereof.

At least one of the (c) two or more additives is a surfactant that is defined as a compound that reduces surface tension in an aqueous formulation composition. In most embodiments, this essential surfactant is a foaming agent that functions to create and enhance foam formation. In many such embodiments, the (c) two or more additives comprise one or more foaming agents (or foaming surfactants) as well as one or more foam stabilizing agents (or foam stabilizers) that are also surface active agents that function to structure and stabilize the foam. Examples of useful foaming agents (foaming surfactants) that are also surface-active agents, and foam stabilizers include but are not limited to, ammonium stearate, ammonium palmitate, sodium lauryl sulfate, ammonium lauryl sulfate, ammonium or sodium alkyl sulfosuccinate, disodium stearyl sulfosuccinate, diammonium n-octadecyl sulfosuccinamate, ethoxylated alcohols, ionic or nonionic agents such as fatty acid soaps or a fatty acid condensation product with an alkaline oxide, for example, the condensation product of ethylene oxide with lauryl or oleic acid or an ester of fatty acids and similar materials, many of which can be obtained from various commercial sources. Mixtures of foaming agents can be used if desired. Some of the noted compounds also act as foam stabilizers, but it best to use both a foaming surfactant (agent) and a foam stabilizer together for synergistic effects of foaming and stabilization.

The relative amounts of each of the foaming surfactants and foam stabilizers is not critical as long as the desired functions are evident, that is suitable foaming properties as required to prepare an aqueous foamed opacifying composition, and stability of that aqueous foamed opacifying composition during storage and manufacture of the laminate precursors described herein. The optimal amounts of each of these (c) two or more additives can be determined by using routine experimentation and the teaching provided herein.

Useful biocides (that is, antimicrobial agents and antifungal agents) that can be present as (c) two or more additives and can include but are not limited to, silver particles, platelets, or fibrous strands, and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper particles, platelets, or fibrous strands and copper-containing compounds such as copper chelates and copper salts can be present as (c) two or more additives for biocidal purposes.

It can also be useful to include thickeners as (c) two or more additives in order to modify the viscosity of the aqueous foamed opacifying composition and to control its rheology.

In some embodiments, the (c) two or more additives further comprises one or more of an antimicrobial agent, a fire retardant, or both an antimicrobial agent and a fire retardant.

(d) Aqueous Medium:

After the aqueous foamed opacifying composition (described below) has been applied to the back side of the non-woven fabric and dried, residual aqueous medium including water or auxiliary solvents (described below) in the dry foamed opacifying layer is desirably less than 5 weight %, or even less than 2 weight %, of the total dry foamed opacifying layer weight.

(e) Opacifying Colorants:

The use of (e) opacifying colorants in a dry foamed opacifying layer is desirable to block or absorb incident electromagnetic radiation within the range of wavelengths of at least 380 nm and up to and including 800 nm. The (e) opacifying colorants can be water-soluble dyes or water-dispersible pigments, or combinations of each or both types of materials. The amount of electromagnetic radiation that can be blocked or absorbed by an (e) opacifying colorant can be determined by measuring opacity of an applied composition as described below. The (e) opacifying colorant can be a single colorant or a combination of materials that collectively act as the "opacifying colorant."

In many embodiments, the (c) opacifying colorant can be present within the (a) porous particles, for example, within a volume of at least some, if not all, discrete pores within the (a) porous particles or incorporated within the continuous polymeric binder of the (a) porous particles, or within both the volume of discrete pores and the continuous polymeric binder of the (a) porous particles. This is highly advantageous as the (a) porous particles can be used to "encapsulate" various (e) opacifying colorants as well as some or all of the (c) two or more additives (described below) so they are kept isolated from the other components of the dry foamed opacifying layer. For example, the (e) opacifying colorant can be located solely within the (a) porous particles. In other embodiments, it can be useful to incorporate (e) opacifying agents solely or additionally within the (b) binder material in which the (a) porous particles are dispersed.

While the (e) opacifying colorants can provide some coloration or desired hue, they are not purposely chosen for this purpose and are thus materials that are chosen to be different from the tinting colorants described herein as (c) two or more additives or for the anti-blocking material.

Examples of (e) opacifying colorants that can be used individually or in combination include but are not limited to, neutral or black pigments or dyes (other than a carbon black), carbon black, black iron oxide, graphite, aniline black, anthraquinone black, or combinations thereof, and combinations of colored pigments or dyes such as cyan, magenta, yellow, green, orange, blue, red and, violet dyes. The present invention is not limited to only the specific (e) opacifying colorants described herein but these are considered as suitable guidance for a skilled worker to devise other combinations of (e) opacifying colorants for the desired absorption in a chosen range of electromagnetic radiation. A carbon black or neutral or black pigment or dye other than a carbon black, of which there are many types available from commercial sources, is particularly useful as an (e) opacifying colorant.

The (e) opacifying colorant can be generally present in the dry foamed opacifying layer in an amount of at least 0.002 weight % and up to and including 2 weight %, or even at least 0.02 weight % and up to and including 1 weight %, all based on the total weight of the dry foamed opacifying layer (including any aqueous medium). As mixtures of the materials can be used if desired, these amounts also refer to the total amount of a mixture of materials used as the (e) opacifying colorant. As noted above, an (e) opacifying colorant can comprise a combination of two or more component materials (such as a combination of dyes or a combination of pigments) designed in hues and amounts so that the combination meets the desired black-out and coloration properties described herein.

In some embodiments, the (e) opacifying colorants, if in pigment form, are generally milled to a fine particle size and then encapsulated within the volume of the discrete pores of the (a) porous particles by incorporating the milled pigment within an aqueous phase used in making the (a) porous particles. Alternatively, the (e) opacifying colorant can be incorporated within the continuous polymeric phase of the (a) porous particles by incorporating the (e) opacifying colorant in the oil phase used in making the (a) porous particles. Such arrangements can be achieved during the manufacture of the (a) porous particles using the teaching provided herein and the teaching provided in references cited above for making the (a) porous particles.

In some embodiments, it can be useful to incorporate at least 95% (by weight) of the total (e) opacifying colorant within the volume of the (a) porous particles (either in the discrete pores, continuous polymeric phase, or both), and to incorporate the remainder, if any, within the (b) binder material. However, in many other embodiments, 100% of the (e) opacifying colorant is incorporated within the (a) porous particles. For example, more than 50% of the total (e) opacifying colorant can be disposed or incorporated within the continuous polymeric phase of the (a) porous particles, and the remainder can be incorporated within the volume of the discrete pores. Alternatively, all the (e) opacifying colorant can be incorporated into the volume of the discrete pores.

Aqueous Foamable Opacifying Compositions

The dry foamed opacifying layers formed according to the present invention can be provided from corresponding aqueous foamed opacifying compositions that can be prepared using the materials and procedures described below.

The essential (a) through (e) components described above are generally present in an (d) aqueous medium in amounts different from the amounts defined above for the dry foamed opacifying layer. However, the relative percentages (proportions) of the components in the aqueous foamed opacifying composition generally should be the same as in the dry foamed opacifying layer.

The amounts of the components in the aqueous foamable opacifying composition and the aqueous foamed opacifying composition are essentially the same as foaming does not appreciably change the % solids or amounts of each component.

For example, the (a) porous particles (as described above) can be present in an aqueous foamed opacifying composition in an amount of at least 0.05 weight % and up to and including 20 weight %, or typically of at least 0.5 weight % and up to and including 15 weight %, all based on the total weight of the aqueous foamed opacifying composition. Such (a) porous particles generally have a mode particle size of at least 2 μm and up to and including 50 μm and a porosity of at least 20 volume % and up to and including 70 volume %.

One or more (b) binder materials (as described above) can be present in the aqueous foamed opacifying composition in an amount of at least 15 weight % and up to and including 70 weight % or typically of at least 30 weight % and up to and including 50 weight %, all based on the total weight of the aqueous foamed opacifying composition.

The (c) two or more additives (as described above) can be present in the aqueous foamed opacifying composition in an amount of at least 0.0001 weight % and up to and including 30 weight % or typically of at least 0.001 weight % and up to and including 20 weight %, all based on the total weight of the aqueous foamed opacifying composition. At least one of such (c) two or more additives is a foaming surfactant (as described above) and another is a foam stabilizer (as described above). These amounts refer to the total of all of the (c) two or more additives, not to each additive individually.

The one or more (e) opacifying colorants (as described above) can be present in the aqueous foamed opacifying composition in an amount of at least 0.0001 weight % or at least 0.003 weight % and up to and including 0.5 weight %, or even in an amount of least 0.003 weight % and up to and including 0.2 weight % especially when the opacifying colorant is a carbon black, all based on the total weight of the aqueous foamed opacifying composition.

Water is the predominant solvent used in an (d) aqueous medium in the aqueous formulations. By "predominant" is meant that of the total weight of solvents in the (d) aqueous medium, water comprises at least 75 weight %, and more likely at least 80 weight % and up to and including 100 weight %, of the total solvent weight. Auxiliary solvents that can be present must not adversely affect or harm the other components in the aqueous formulation. Such auxiliary solvents can be water-miscible organic solvents such as alcohols and ketones.

The aqueous medium can comprise at least 30 weight % and up to and including 70 weight %, or typically at least 40 weight % and up to and including 60 weight %, of the total aqueous foamed opacifying composition weight.

All (a), (b), (c), and (e) components can be suitably mixed in an (d) aqueous medium by dispersing with a cowles blade. Representative time and temperature conditions for making such aqueous foamed opacifying compositions would be readily apparent to one skilled in the art.

Making Laminate Precursors

According to the present invention, laminate precursors, in rolled form, can be independently provided (step A) from one or more different non-woven fabrics, as described above, each having a face side and a back side. The face side is considered the side of the non-woven fabric that is viewable and left uncovered. A skilled worker can decide which "side" is best for application of the aqueous foamed opacifying composition. For example, the worker may choose the back side as the less aesthetically appealing side of the non-woven fabric and then the opposing side that has the nicer touch or color may be chosen as the face side.

The dry foamed opacifying layer provided in each laminate precursor typically comprises (a) porous particles, a (b') matrix material, (c) two or more additives, an (e) opacifying colorant, and possibly some residual (d) aqueous medium, all of which are described in more detail above. The amounts of each of these components in the dry foamed opacifying layer can be as follows, all based on the total dry foamed opacifying layer weight:

(a) porous particles in an amount of at least 0.1 weight % and up to and including 35 weight %, or typically at least 0.5 weight % and up to and including 25 weight %, or even at least 1 weight % and up to and including 20 weight %;

(b') the one or more matrix materials derived from one or more (b) binder materials, can be present in the dry foamed opacifying layer in an amount of at least 10 weight % and up to and including 80 weight %, or typically at least 20 weight % and up to and including 60 weight %;

(c) two or more additives in an amount of at least 0.0001 weight % and up to and including 50 weight % and typically at least 1 weight % and up to and including 45 weight %, and the two or more additives typically comprise at least one foaming surfactant and at least one compound that is a foam stabilizer; and (e) an opacifying colorant in an amount of at least 0.002 weight % and up to and including 2 weight %, or even at least 0.02 weight % and up to and including 1 weight %, all based on the total weight of the dry foamed opacifying layer, the opacifying colorant being a different material from all of the (a) porous particles, (b') binder matrix, and (c) two or more additives, and which opacifying colorant absorbs electromagnetic radiation having a wavelength of at least 380 nm and up to and including 800 nm.

Previously to or in combination with step A) according to the present invention, an aqueous foamed opacifying composition can be formed by appropriate foaming or aerating a corresponding aqueous foamable opacifying composition that has basically the same materials and component concentration.

Thus, the aqueous foamable opacifying composition can be aerated to provide an aqueous foamed opacifying composition having a foam density of at least 0.1 g/cm$^3$ and up to and including 0.5 g/cm$^3$, or of at least 0.15 g/cm$^3$ and up to and including 0.4 g/cm$^3$, or even of at least 0.15 g/cm$^3$ and up to and including 0.27 g/cm$^3$. This aeration procedure can be carried out using suitable conditions and equipment that would be readily apparent to one skilled in the art in order to create a "foam," for example in the presence of a foaming surfactant and foam stabilizer that are present at least within the (c) two or more additives described above. For example, aeration can be carried out by mechanically introducing air or an inert gas (such as nitrogen or argon) in a controlled manner. High shear mechanical aeration can be carried out using sonication or high-speed mixers, such as those equipped with a cowles blade, or with commercially available rotorstator mixers with interdigitated pins such as an Oakes mixer or a Hobart mixer, by introducing air under pressure or by drawing atmospheric air into the aqueous foamable opacifying composition with the whipping action of the mixer. Suitable foaming equipment can be used in a manner to provide the desired foam density with modest experimentation. It can be useful to chill or cool the aqueous foamable opacifying composition below ambient temperature to increase stability by increasing composition viscosity, and to prevent its collapse. This chilling operation can be carried out immediately before, immediately after, or during the aeration procedure. Stability of the resulting aqueous foamed opacifying composition can also be enhanced by the presence of the foam stabilizer agent as one of the (c) two or more additives.

Onto the back side of one of more of these non-woven fabrics, an aqueous foamed opacifying composition described above can be applied (step B) to provide an applied coating or layer of that aqueous foamed opacifying composition. The wet coverage of the applied aqueous foamed opacifying compositions can be the same or different on the one or more different non-woven fabrics, that upon drying, can provide the desired dry coverage as described herein.

Each aqueous foamed opacifying composition can be applied using a suitable application means and in any suitable manner. For example, the non-woven fabric can be coated with an aqueous foamed opacifying composition using a floating knife, hopper, blade, or gap coating apparatus and appropriate coating procedures including but not limited to blade coating, gap coating such as "knife-over-roll" and "knife-over-table" operation, floating knife, slot die coating, or slide hopper coating. Thus, the aqueous foamed opacifying composition can be disposed directly onto a back side of the non-woven fabric wherein "directly" means there are no intervening or intermediate layers, or it can be disposed indirectly onto the back side of the non-woven fabric, meaning that an interlayer of some type (primer or adhesive layer) can be present.

The applied aqueous foamed opacifying composition can be dried (step C) to provide a dry coverage of less than or equal to 1000 g/m$^2$, and generally at least 50 g/m$^2$, or at least 100 g/m$^2$ and up to and including 500 g/m$^2$ of a dry foamed opacifying layer having a light blocking value ($LBV_{oc}$) of at least 2, or at least 3. In reference to a dry foamed opacifying layer, the term "dry" means that the layer comprises the aqueous medium (described below) in an amount of less than 5 weight %, or even less than 2 weight %, based on the total weight of the dry foamed opacifying layer. Drying operations to remove most or all of the aqueous medium can be achieved using suitable apparatus and treatments with heat or radiation that does not adversely affect the non-woven fabric and the aqueous foamed opacifying composition. For example, drying can be accomplished by heating with warm or hot air, microwaves, or IR irradiation at a temperature and time sufficient for drying (for example, at least 160° C.) to provide a dry foamed opacifying layer.

The drying step C) can also cause at least partial curing of the dry foamed opacifying layer especially if curable or crosslinkable polymers and appropriate catalysts are present. For example, a curing or crosslinking reaction can occur between reactive side groups of suitable curable polymer chains in a functionalized self-crosslinking latex composition to form (b') matrix material from the (b) binder material. If the chosen (b) binder material is not itself heat reactive, suitable catalysts and curing (crosslinking) agents can be added to promote curing or crosslinking.

Either between the B) applying step and the C) drying step, or immediately after the C) drying step, an anti-blocking composition formulation can be applied (step D) to each applied foamed opacifying composition to form one or more corresponding laminate precursors having anti-blocking material back side and a non-woven fabric face side. The use of an anti-blocking composition according to the present invention is optional but desirable in many embodiments. The one or more laminate precursors can have the same or different non-woven fabrics, the same or different applied foamed opacifying compositions, and the same or different anti-blocking material.

Useful anti-blocking materials can be provided from an anti-blocking composition formulation comprising one or more of organic or inorganic particles. An anti-blocking composition derived therefrom and useful in the practice of this invention can provide one or more functional properties but the primary function is to keep the non-woven face side from sticking to the opposite side of the rolled up laminate precursor.

Thus, the anti-blocking composition can provide a "release" function where the coefficient of friction between the dry opacifying layer side of the laminate precursor and any other solid surface such as the face side of the non-woven fabric, in rolled form, is reduced allowing easy separation of the contacting surfaces; or an anti-blocking function where microscopic protrusions or asperities help to minimize surface contact between the surfaces by increasing the distance between the two contacting surfaces, thereby minimizing blocking.

Thus, the term "anti-blocking" does not refer to blocking of impinging radiation as in "light-blocking," but refers to the function described above to keep one side of rolled articles sticking to the opposite side.

Before application, each anti-blocking composition formulation is prepared as an aqueous dispersion of the desired components. For example, in particularly useful embodiments, the anti-blocking composition formulation can comprise inorganic or organic spacer particles in admixture with an organic polymeric binder, and a crosslinking agent for the (iv) organic polymeric binder, and if needed, an optional thickener and a coating aid including but not limited to a wetting surfactant (having a hydrophilic-lipophilic balance number of at least 7), all mixed together in water to form a stable aqueous dispersion.

As described below, an anti-blocking composition formulation can be disposed over (for example, directly on) the applied foamed opacifying composition in a uniform continuous manner to provide one or more anti-blocking materials in the anti-blocking composition. In other embodiments, the anti-blocking composition formulation can be disposed in a discontinuous manner, in small or large regions, for example, from spraying to form a regular or irregular pattern.

In some embodiments, the anti-blocking composition formulation can be foamed similarly to foaming of the aqueous foamable opacifying composition described above before it is applied.

The anti-blocking composition can be present at a dry coverage of at least 0.1 $g/m^2$ and up to and including 50 $g/m^2$ or of at least 5 $g/m^2$ and up to and including 25 $g/m^2$.

Useful inorganic or organic spacer particles generally have a mode particle size of at least 1 µm, or of at least 2 µm and up to and including 100 µm, or up to and including 30 µm, or even at least 2 µm and up to and including 20 µm. Mode particle size can be determined as described above for the definition of the sizes of (a) porous particles.

In addition, these inorganic or organic spacer particles are capable of resisting melt flow at pressures up to and including 100 psi (689.5 kPa) and temperatures up to and including 220° C.

Useful inorganic or organic spacer particles can comprise natural or synthetic silica; talc; clay; mica; calcium carbonate; nylon; glass particles; a polytetrafluoroethylene, a crosslinked silicone based organic polymer, a poly(alkylsilylsesquioxane); a crosslinked styrenic polymer or copolymer; a crosslinked acrylate or methacrylate polymer or copolymer; a crosslinked acrylamide or methacrylamide polymer or copolymer; a crosslinked allylic polymer or copolymer; or a combination of two or more of these materials. Such materials can be obtained from various commercial sources, or prepared using known procedures and starting materials.

The inorganic or organic spacer particles can be present for example as glass particles, as an anti-blocking material at a dry coverage of at least 0.001 $g/m^2$ and up to and including 30 $g/m^2$, or at least 1 $g/m^2$ and up to and including 20 $g/m^2$.

The anti-blocking composition can also comprise an organic polymeric binder in which the organic or inorganic spacer particles, and other components are dispersed. This organic polymeric binder can be water-soluble or water-dispersible and can comprise one or more materials. In addition, the organic polymeric binder can be film-forming, that is, it can form a film once applied and dried. Such materials can be self-crosslinkable and crosslinkable using a suitable crosslinking agent as described below. Useful organic polymeric binders include but are not limited to, film forming polymers such as a partially hydrolyzed polyvinyl acetate, poly(vinyl alcohol), poly(vinyl pyrrolidone), cellulosic polymers (such as carboxymethyl cellulose and hydroxymethyl cellulose), a polysaccharide, a poly(ethylene oxide), acrylamide polymers, polyester ionomers, gelatin or gelatin derivatives, gellan, starches, polyethylene imine, polyvinyl amine, and derivatives of these materials, polyurethanes, urethane-acrylic copolymers, other acrylic polymers, styrene-acrylic copolymers, vinyl polymers, and polyesters, or a combination of two or more of these organic polymer binders. Such organic polymeric binders are readily available from various commercial sources or prepared using known starting materials and synthetic conditions. The organic polymeric binder can be useful for adhering the organic or inorganic spacer particles and other noted components onto the outer surface of the applied aqueous foamed opacifying composition.

The organic polymeric binder can be present in an amount of at least 1 weight % and up to and including 90 weight %, or typically at least 5 weight % and up to and including 75 weight %, based on the total dry applied anti-blocking material formulation weight.

Additionally, it may be beneficial to chemically crosslink some organic polymeric binders to improve cohesiveness. Such organic polymeric binders can be at least partially curable or crosslinkable, and can be cured up to 100% of all potential curable or crosslinking sites. The identity and amount of a suitable crosslinking agent would be readily determined by a skilled worker and will depend on the choice of organic polymeric binder and its reactivity with the crosslinking agent, the number of crosslinking sites available, compatibility with other components, and manufacturing constraints such as formulation pot life, application means, and drying speed.

The anti-blocking composition formulation can be prepared using one or more wetting surfactants or coating aids to aid in its coating or deposition onto the applied aqueous foamed opacifying composition.

If the anti-blocking composition formulation is to be disposed by spraying, surfactants known in the art as spreading agents that are capable of reducing the surface tension substantially to aid in the formation of small drops.

The applied anti-blocking composition formulation can include one or more of various additives that provide various properties or characteristics, such as a biocide or antimicrobial agent of which there are numerous materials known in the art for this purpose (including silver metal and silver salts); antistatic agents known in the art to dissipate electrical charge and static; tactile modifiers, visual modifiers that provide a matte, opalescent or other such desirable look; and soil resistance agents that reduce the potential for soiling from handling or spills.

In some embodiments, the anti-blocking composition (and anti-blocking composition formulation) comprises inorganic spacer particles comprising glass particles, an organic polymeric binder, and optionally a thickener or coating aid, or both a thickener and a coating aid.

If desired, the applied anti-blocking composition formulation in each laminate precursor can be partially or totally cured after the D) applying step and before the E) densifying step (described below), using suitable conditions, similarly to the C) drying step.

Subsequent to or simultaneously with the D) applying step, the dry foamed opacifying layer is densified (or crushed) so that it will have a thickness that is at least 20% less than its thickness before densifying. Densification or crushing is a process of subjecting the dry foamed opacifying layer to mechanical pressure, to densify (reduce foamed volume) and to reduce composition thickness. This process can be carried out in any suitable manner but it is generally carried out by a process that provides pressure to the dry foamed opacifying layer, for example, by passing the laminate precursor through a compression calendering operation, pressing operation, or embossing operation, or a combination thereof. For example, the laminate precursor can be pressed between flat plates or through nip rollers under pressure, or it can be passed through a combination of calendering and embossing rollers to reduce the thickness of the dry foamed opacifying layer and to densify the foam structure therein. This process can be considered a "densifying operation" as the dry foamed opacifying layer is made denser while it is pressed together. The thickness of the dry foamed opacifying layer before and after crushing (densifying) can be determined by a known technique such as laser profilometry.

The crushing or densifying operation can be carried out at any suitable temperature including room temperature (for example, 20-25° C.) and up to and including 90° C., or more likely at a temperature of at least 20° C. and up to and including 90° C. The crushing or densifying operation can be carried out at nip pressures that are suitable for the construction of the non-woven fabric including the openness factor to prevent over crushing and consequent loss of uniform opacity of the dry foamed opacifying layer. A useful crushing pressure can be determined using routine experimentation depending upon several factors including the dry foamed opacifying components and type and weight of non-woven fabric used. For example, a useful crushing or densification pressure can be at least 15 psi (103.4 kPa) and up to and including 200 psi (1379 kPa).

Once densification is completed, each laminate precursor can be rolled up so that the anti-blocking composition side is in contact with the face side of the non-woven fabric, thereby providing one or more laminate precursor rolls for immediate or future use.

Preparation of Laminated Decorative Articles

When a decorative fabric is provided with a face side and a back side (step G), one or more laminate precursor rolls can be unrolled (step H) and laminated, with the back side of the decorative fabric in contact with the dry foamed opacifying layer of the unrolled laminate precursor roll. Under such laminating conditions, one or more laminated light-blocking decorative articles are formed. It is also possible that the G) laminating step includes further curing of the dry foamed opacifying layer in the unrolled laminate precursor roll.

One suitable technique includes the use of an adhesive material such as a thin intermediate heat seal or cold seal adhesive material between the decorative fabric back side and the dry foamed opacifying layer of the unrolled laminate precursor roll. In some embodiments, the adhesive material is incorporated within the anti-blocking composition or within the aqueous foamed opacifying composition, or within both the anti-blocking composition and the aqueous foamed opacifying composition.

When using a heat seal adhesive, the laminate precursor can be supplied from a suitable laminate precursor roll (for example, as a supply roll); the heat seal adhesive can be applied to one of the surfaces to be adhered; and then the unrolled laminate precursor and the decorative fabric from a suitable source (for example, a second supply roll) can be brought together during lamination. Alternatively or additionally, the heat seal adhesive can be supplied to the back side of the decorative fabric and the two articles are brought together during lamination. In other embodiments, a heat seal adhesive can be applied to both articles before they are brought together during lamination. The heat seal adhesive also can be supplied (sprayed or squirted) between the two articles as they are brought together. The heat seal adhesive, after being heated, is then allowed to cool for example to room temperature, followed by laminating the unrolled laminate precursor and the decorative fabric.

Suitable adhesive materials are known in the art, and can comprise at least one polyamide, polyester, epoxy resin, acrylic resin, anhydride modified polyolefin, polyurethane, or blends of two or more types of polymers.

Other adhesive materials can be used in the present invention including but not limited to use of a layer of any cold seal or pressure-sensitive, photosensitive, or thermally-sensitive adhesive precursor material, followed by "activation" to create an adhesive layer using pressure, photo-exposure, or thermal exposure, respectively. For example, liquid adhesives can be used including plastisol, epoxy, acrylic, organosol, and urethane adhesives that can be applied to either the laminate precursor roll with a suitable coating technique (gravure cylinder, knife, roller, reverse roller, or anilox roller) under heat, followed by cooling to secure the adhesive bond.

It is also possible to laminate the laminate precursor and the decorative fabric without the use of an intermediate adhesive layer. This can be done in any suitable manner known in the art using mechanical means without an adhesive means, using for example, direct calendar lamination to form a mechanical bond between the two articles. In direct calendar lamination, the two articles are brought together for example, under heat from appropriate sources (for example, individual supply rolls) and fed together into pressure rollers or a combination of calendar and embossing rollers to form the mechanical bonding upon cooling. The resulting laminated light-blocking decorative article can then be taken up into a roll or otherwise stored or immediately used in finishing operations.

Alternatively or additionally, the face side of the non-woven fabric can be modified with embossing or printing to provide one or more images or patterns using known procedures such as inkjet printing or flexographic printing, thereby forming one or more printed images of text, pictures, symbols, or combinations thereof. Such printed images can be visible, or they can be invisible to the unaided eye (for example, using fluorescent dyes in the printed images). Alternatively, an outer surface can be covered by suitable means with a colorless continuous or discontinuous layer to provide a desired protective finish, or anti-microbial or soil release properties. In many instances, the image formed in this manner, for example, on an outer surface, is not visible or discernible from the other outer surface of the laminated light-blocking decorative article.

A thermally printed image can be formed on the face side of the non-woven fabric or on the face side of the decorative fabric, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches (areas) with or without a thermal colorless (clear) patch (area). Useful details of such a process are provided in U.S. Patent Application Publication 2018/0327965 (Herrick et al.), the disclosure of which is incorporated herein by reference.

In some embodiments, the laminated light-blocking decorative article prepared according to this invention is a blackout drapery exhibiting a stiffness of less than 15 mN, as measured by L&W bending force as measured using a L&W bending force test and an L&W Bending Tester apparatus (Lorentzen and Wettre Products).

In other embodiments, a laminated light-blocking decorative article prepared according to this invention can be a blackout shade fabric exhibiting a stiffness of at least 15 mN, as measured by L&W bending force test and apparatus noted above.

For example, a laminated light-blocking decorative article prepared according to this invention can be a window shade having coloration, blackout, feel, and other properties desired by the customer.

The invention has been described in detail with particular reference to certain preferred embodiments thereof, but it will be understood that variations and modifications can be achieved within the spirit and scope of the invention.

The invention claimed is:

1. A laminate precursor roll comprising a non-woven fabric having a face side and a back side, a dry foamed opacifying layer that is disposed on the back side of the non-woven fabric, and an anti-blocking composition disposed on the dry foamed opacifying layer,
    wherein the face side of the non-woven fabric is rolled up in contact with the non-blocking composition, and
    the dry foamed opacifying layer being present at a dry coverage of at least 50 g/m² and less than or equal to 1000 g/m², and comprising:
    (a) porous particles in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;
    (b') a matrix material that is derived from a (b) binder material having a glass transition temperature ($T_g$) of less than 25° C., which (b') matrix material is present in an amount of at least 10 weight % and up to and including 80 weight %,
    (c) two or more additives in an amount of at least 0.0001 weight % and up to and including 50 weight %, the two or more additives comprising at least one foaming surfactant and at least one foam stabilizer,
    (d) an aqueous medium in an amount of less than 5 weight %, and
    (e) an opacifying colorant in an amount of at least 0.002 weight % and up to and including 2 weight %, which opacifying colorant being a different material from the (a) porous particles, (b') matrix material, and (c) two or more additives, and which opacifying colorant absorbs electromagnetic radiation having a wavelength of at least 380 nm and up to and including 800 nm,
    all amounts of (a) porous particles, (b') matrix material, (c) two or more additives, (d) aqueous medium, and (e) opacifying colorant being based on the total weight of the dry foamed opacifying layer.

2. The laminate precursor roll of claim 1, wherein the non-woven fabric is a spunlaced non-woven fabric.

3. The laminate precursor roll of claim 1, wherein the non-woven fabric is a blended fabric.

4. The laminate precursor roll of claim 1, wherein face side of the non-woven fabric has one or more printed images.

5. The laminate precursor roll of claim 1, wherein the non-woven fabric has a basis weight of at least 0.5 oz/yd² (16.95 g/m²) and up to and including 25 oz/yd² (847.7 g/m²).

6. The laminate precursor roll of claim 1, wherein the non-woven fabric comprises an antimicrobial agent, a fire retardant, or a soil release agent, or any combination thereof.

7. The laminate precursor roll of claim 1, wherein the anti-blocking composition comprises one or more organic or inorganic particles having a mode particle size of at least 1 μm and up to and including 30 μm.

8. The laminate precursor roll of claim 7, wherein the anti-blocking composition comprises glass particles as an anti-blocking material at a dry coverage of at least 0.001 g/m² and up to and including 30 g/m².

9. The laminate precursor roll of claim 1, wherein the (e) opacifying colorant is a carbon black, a neutral black pigment or a dye other than a carbon black, or a combination of two or more of such materials.

10. The laminate precursor roll of claim 1, wherein the (e) opacifying colorant is located solely in the (a) porous particles.

11. The laminate precursor roll of claim 1, wherein the dry foamed opacifying layer further comprises an adhesive material.

12. The laminate precursor roll of claim 1, wherein the (c) two or more additives further comprise one or more of an antimicrobial agent, a fire retardant, or both an antimicrobial agent and a fire retardant.

13. The laminate precursor roll of claim 1, wherein the (b) binder material has a glass transition temperature ($T_g$) of less than 25° C.

14. The laminate precursor roll of claim 1, wherein the continuous polymeric phase of the (a) porous particles comprises one or more cellulose polymers, a polyester, or a polystyrene.

15. The laminate precursor roll of claim 1, wherein the (b) binder material comprises a crosslinkable polymer and a crosslinking agent.

16. The laminate precursor roll of claim 1, wherein the at least one foaming surfactant and the at least one foam stabilizer are independently one of the following compounds, or a mixture thereof: ammonium stearate, ammonium palmitate, sodium lauryl sulfate, ammonium lauryl sulfate, ammonium or sodium alkyl sulfosuccinate, disodium stearyl sulfosuccinate, diammonium n-octadecyl sulfosuccinamate, ethoxylated alcohols, a fatty acid soap, and a fatty acid condensation product with an alkylene oxide.

17. The laminate precursor roll of claim 1, wherein the anti-blocking composition comprises glass particles as spacer particles, an organic polymeric binder, and optionally a thickener or coating aid, or both a thickener and coating aid.

18. The laminate precursor roll of claim 1, wherein the anti-blocking composition is present at a dry coverage of at least 0.1 g/m² and up to and including 25 g/m².

19. A laminated decorative article comprising:
a decorative fabric having a face side and a back side; and
a laminate precursor roll comprising a non-woven fabric having a face side and a back side, a dry foamed opacifying layer that is disposed on the back side of the non-woven fabric, and an anti-blocking composition disposed on the dry foamed opacifying layer,
wherein the face side of the non-woven fabric is rolled up in contact with the non-blocking composition, and
the dry foamed opacifying layer being present at a dry coverage of at least 50 g/m² and less than or equal to 1000 g/m², and comprising:
(a) porous particles in an amount of at least 0.1 weight % and up to and including 35 weight %, each porous particle comprising a continuous polymeric phase and discrete pores dispersed within the continuous polymeric phase, the porous particles having a mode particle size of at least 2 µm and up to and including 50 µm and a porosity of at least 20 volume % and up to and including 70 volume %;
(b') a matrix material that is derived from a (b) binder material having a glass transition temperature ($T_g$) of less than 25° C., which (b') matrix material is present in an amount of at least 10 weight % and up to and including 80 weight %,
(c) two or more additives in an amount of at least 0.0001 weight % and up to and including 50 weight %, the two or more additives comprising at least one foaming surfactant and at least one foam stabilizer,
(d) an aqueous medium in an amount of less than 5 weight %, and
(e) an opacifying colorant in an amount of at least 0.002 weight % and up to and including 2 weight %, which opacifying colorant being a different material from the (a) porous particles, (b') matrix material, and (c) two or more additives, and which opacifying colorant absorbs electromagnetic radiation having a wavelength of at least 380 nm and up to and including 800 nm, all amounts of (a) porous particles, (b') matrix material, (c) two or more additives, (d) aqueous medium, and (e) opacifying colorant being based on the total weight of the dry foamed opacifying layer,
wherein the back side of the decorative fabric is laminated in contact with the dry foamed opacifying layer of the laminate precursor roll.

20. The laminated decorative article of claim 19, further comprising an adhesive material that is either present between the decorative fabric back side and the dry foamed opacifying layer, or present within the dry foamed opacifying layer.

* * * * *